United States Patent Office 3,830,946
Patented Aug. 20, 1974

3,830,946
PROCESS FOR THE PRODUCTION OF FRITTATEN
Alois Ruhdorfer, Membergerstrasse 15, Salzburg, Austria
Continuation of abandoned application Ser. No. 871,906, Oct. 28, 1969. This application May 1, 1972, Ser. No. 249,618
Int. Cl. A23l 1/10, 1/16
U.S. Cl. 426—347                    7 Claims

ABSTRACT OF THE DISCLOSURE

The production of Frittaten is improved by dehydration of dough that has been baked and browned on both sides and cut into short length narrow strips in cooking oil or fat heated to 100° to 190° C. until the product reaches a water content below 7% by weight.

CROSS REFERENCE TO RELATED APPLICATION

This application is a continuation of copending application Ser. No. 871,906, filed Oct. 28, 1969, now abandoned.

This invention relates to a process for the production of Frittaten, in which a mass of dough baked on both sides is cut up into Frittaten-shaped pieces and is subsequently dehydrated. The term "Frittaten" is the name given to thin pancakes cut into little strips like noodles and used in soups or other food products.

In the case of known processes, dough baked on both sides is produced by inserting Frittaten dough between two revolving heated drums. The mass of dough is subsequently cut into pieces of 50 cm. width, these pieces are dried for one to two days in order to facilitate the cutting, they are cut and subsequently dried in a hot air current, for example, in the manner of noodles. This drying out is necessary to avoid spoilage of the goods which will reach the market ready-packed.

The customary manner of drying out is cumbersome and, moreover, leads to end-products of an inferior quality. The present invention avoids these disadvantages because it provides for the dehydration to be accomplished in such a manner that the Frittaten are put into hot oil or fat, the temperature of which is in the range of about 100° to 190° C., and where they are left until they reach a water content below 7% by weight and preferably below 2% by weight.

In the case of the use of oil, the temperature of which lies considerably below the stated temperature, the dough will stew without being dehydrated. Extremely high fat content is created in the dough without, on the other hand, the water escaping with the sort of speed as can be achieved by surpassing the boiling temperature. An increase in the temperature beyond the upper limit stated decreases the quality of the fat in the case of an extended operation and degrades the product quality. Preferably, the oil temperature as used lies above 120° C.

Under all circumstances, one must keep within the stated limit of moisture in order to avoid a spoilage of the goods. In practice, substantially no moisture will exist in the end-product if the packaging is accomplished quickly after production.

Preferably, the known process is not only changed with regard to the final drying. If, as has been done hitherto, one allows the dough to set for many hours prior to cutting, a leathery outside layer will develop around a moist core, which makes the thorough cooking of the goods more difficult. Therefore, one will preferably provide for the freshly cooked dough to be fed continuously to a cutting installation which has separating disks between guides, said guides revolving with the speed of the mass of dough, and behind said disks one or several rotating knives guided against a fixed knife are provided.

The invention is explained in more detail on the basis of a design shown in the accompanying drawing by way of example. In the drawing.

Figure 1:
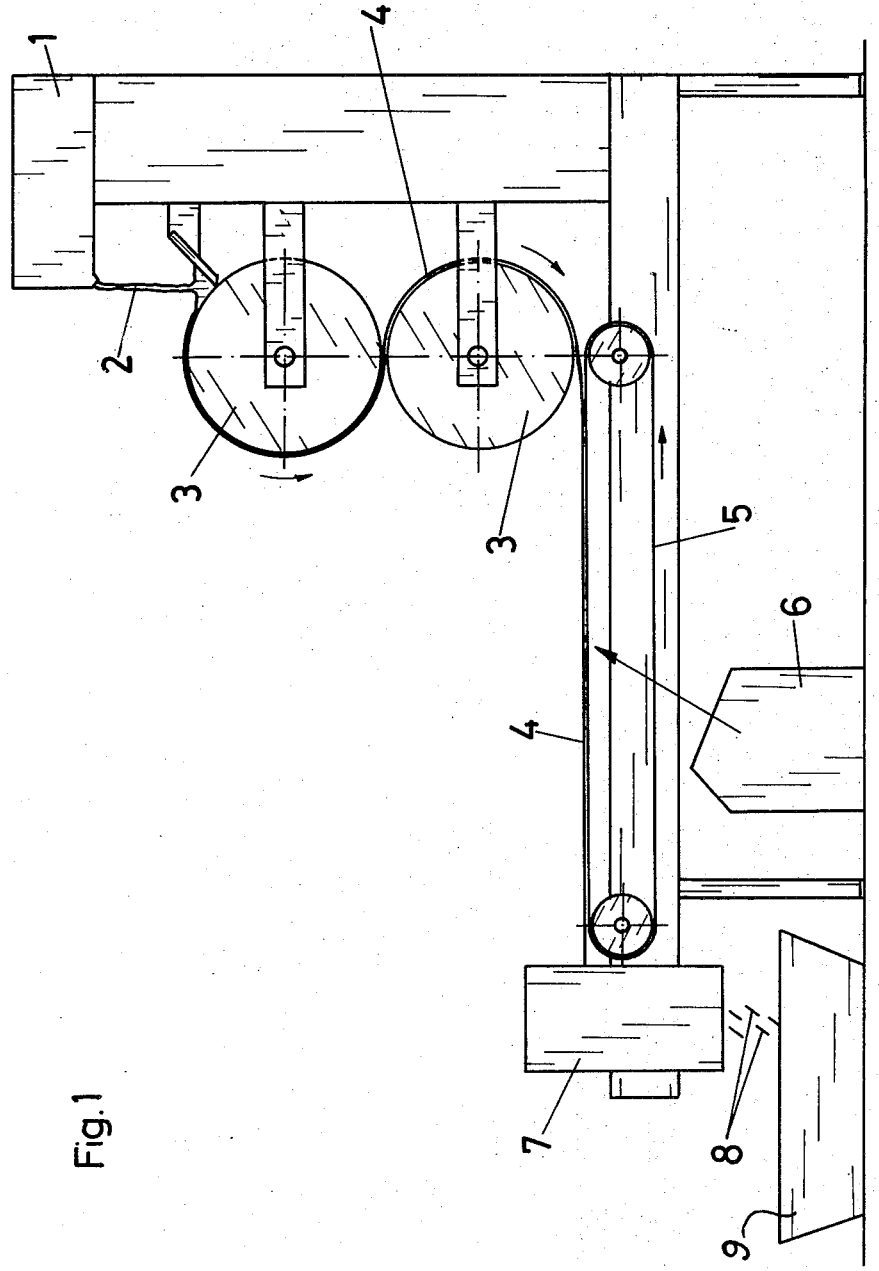
FIG. 1 shows a schematic side view of a device to carry out the invention.
Figure 2:
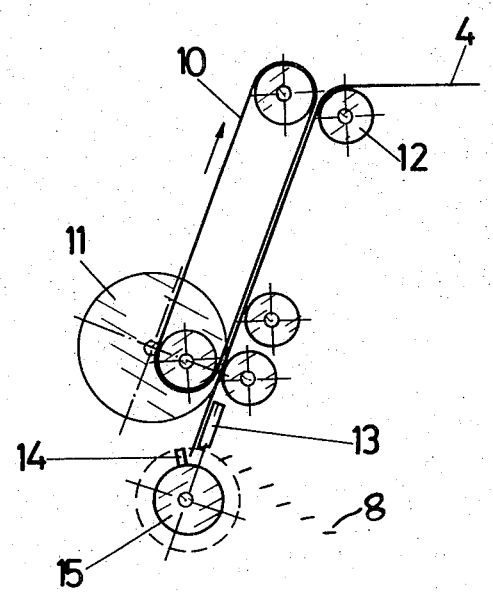
FIG. 2 is a side view of the cutting installation.
Figure 3:
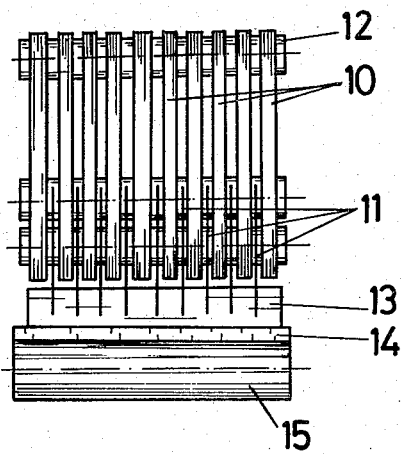
FIG. 3 is a top view of the cutting device.

In the case of the equipment shown in FIG. 1, liquid batter or dough 2 is fed continuously from a container 1 to the upper of the two rollers 3 and is carried along by said roller. The composition of the batter used can differ. Basically, one uses a mixture that is suitable for the production of pancakes or waffles. For example, a mixture seasoned with salt from 56% by weight of water, 40% by weight of wheat flour, 2.5% by weight of powdered milk and 1.5% by weight of powdered egg (whole egg) can be used with success. Both rollers 3 are heated so that the mass of batter 4 is baked on both sides when reaching the conveyer belt 5. A superficial drying of the mass of dough 4 is accomplished, for example, through a hot air blower system 6. In the case of a speed of movement in the order of magnitude of 1 m./min., the drying time is at about one minute. This drastic reduction of the drying time hitherto customarily preceding the cutting process does not lead to any disadvantages, such as sticking or similar things, when using the cutting installation 7 according to the invention. The cutting up of the mass of dough 4 in a half-dried state will be facilitated through the fact that the guides for the mass of dough move with the same speed as the latter, therefore, with the peripheral speed of drums 3. In the present case (FIGS. 2 and 3), these guides consist of belts 10 and counter rollers 12. Immediately after the mass of dough 4 is broken up by the separating disks 11 revolving between the belts 10, the individual strips of dough are broken up finely by means of a knife 15 revolving with a roller 14 and acting against a fixed knife 13.

The half-dried Frittaten 8 are immediately guided to a bath 9 of vegetable cooking oil which heats the Frittaten and as a result of that, drives out the remaining water. The temperature of the vegetable oil used was about 120–150° C.

The oil or fat used for heating and dehydrating the pre-cooked dough may be any edible oil or fat known to be useful for frying and cooking of food products. Vegetable oils are particularly useful, especially those that are processed and blended for good heat stability. Examples include cottonseed oil, soya bean oil, peanut oil, hydrogenated cottonseed oil, coconut oil, margarine, butter fat, mixtures thereof and equivalent vegetable and animal fats and oils.

The batter used in forming the baked dough may be made from any recipe known to be useful in forming pancakes or waffles. This will usually comprise a mixture of grain flour, milk solids or substitute fat solids, protein material, e.g., egg solids, salt and, if desired, shortening and/or leveling material. The recipe will contain sufficient water to provide the desired fluidity and consistency for flowing onto the shaping and cooking drums. Such batter recipes are well known and are not per se critical to the invention.

The described process results in thin pancakes cut into strips of about 30–40 mm. length and 2–3 mm. width, which have been baked to a golden brown and are crisp and crunchy. They are suitable particularly for use in soups but also as tid bits. They differ from the prior known Frittaten, especially through their high fat content which usually lies above 25%, and preferably from 25–50% by weight of the total product weight. The analytical data for a typical product are (data in percent by weight):

| | Percent |
|---|---|
| Ash | 1.86 |
| Common salt | 1.35 |
| Starch | 35.17 |
| Total fat | 47.32 |
| Milk fat | 2.69 |

The embodiments of the invention in which an exclusive property or right is claimed are defined as follows:

1. In a process for the production of Frittaten which comprises providing a batter consisting essentially of wheat flour, milk, eggs and water, forming said batter into a thin layer, baking both surfaces of said thin layer to a brown color, cutting the resulting baked and browned layer in a partially dried state into thin strips, the improvement which comprises dehydrating said thin strips by placing said strips in hot cooking oil or fat, the temperature of which is between about 100° to 190° C. and allowing the strips to remain therein until their water content is below about 7% by weight.

2. A process as claimed in claim 1 wherein the temperature of said hot cooking oil or fat is above 120° C.

3. A process as claimed in claim 1 wherein said strips are left in said oil or fat until their water content is below about 2% by weight and their fat or oil content is above 25% by weight.

4. A process as claimed in claim 1 wherein said baking and browning of said batter layer is by contacting one side of the layer with a first heated drum and contacting the other side of the layer with a second heated drum.

5. The process of claim 4 wherein the layer is removed from said second heated drum and conveyed through hot air blower means.

6. The process of claim 5 wherein said layer upon issuing from said blower means is cut into strips by passage between separated discs which revolve at the speed of travel of said layer and said strips are then cut into short lengths by knives that revolve on an axis transverse to the path of travel of the strips.

7. In a process for the production of Frittaten which comprises providing a batter consisting essentially of wheat flour, milk, eggs and water, forming said batter into a thin layer, baking both surfaces of said thin layer to a brown color by contacting one side of the layer with a first heated drum and contacting the other side of the layer with a second heated drum and thereafter cutting the resulting baked and browned layer into thin strips, the improvement which comprises performing the cutting step within about one minute after baking and thereafter dehydrating said thin strips by placing them in cooking oil or fat heated to a temperature of between about 120° to 190° C. until their water content is below about 2% by weight and their fat or oil content is about 25% by weight.

References Cited

UNITED STATES PATENTS

| 3,259,503 | 7/1966 | Tan et al. | 99—83 |
| 3,539,356 | 11/1970 | Benson et al. | 99—100 P |

OTHER REFERENCES

Zelayeta: "Elena's Secrets of Mexican Cooking," 1958, pp. 116, 120.

RAYMOND N. JONES, Primary Examiner

J. R. HOFFMAN, Assistant Examiner

U.S. Cl. X.R.
426—439, 808

UNITED STATES PATENT OFFICE
CERTIFICATE OF CORRECTION

Patent No. 3,830,946          Dated August 20, 1974

Inventor(s) Alois Ruhdorfer

It is certified that error appears in the above-identified patent and that said Letters Patent are hereby corrected as shown below:

Claims priority, application Austria, Oct. -28, 1968, No. A 10466/68

Signed and sealed this 29th day of October 1974.

(SEAL)
Attest:

McCOY M. GIBSON JR.
Attesting Officer

C. MARSHALL DANN
Commissioner of Patents